(12) United States Patent
Yen et al.

(10) Patent No.: US 10,502,265 B1
(45) Date of Patent: Dec. 10, 2019

(54) TRANSMISSION SHAFT AND PERIPHERAL STRUCTURE

(71) Applicant: Fairway Electronic Co., Ltd., New Taipei (TW)

(72) Inventors: Lin-Han Yen, New Taipei (TW); Chien-Hsiung Hsieh, New Taipei (TW)

(73) Assignee: FAIRWAY ELECTRONIC CO., LTD., New Taipei (TW)

(*) Notice: Subject to any disclaimer, the term of this patent is extended or adjusted under 35 U.S.C. 154(b) by 0 days.

(21) Appl. No.: 16/261,921

(22) Filed: Jan. 30, 2019

(30) Foreign Application Priority Data

Aug. 8, 2018 (TW) .............................. 107127587 A

(51) Int. Cl.
| | |
|---|---|
| *F16C 33/66* | (2006.01) |
| *F16C 33/78* | (2006.01) |
| *F16C 19/16* | (2006.01) |

(52) U.S. Cl.
CPC ............ *F16C 33/664* (2013.01); *F16C 19/16* (2013.01); *F16C 33/782* (2013.01)

(58) Field of Classification Search
CPC ......... F16C 33/664; F16C 19/16; F16C 33/782; F16D 1/101
See application file for complete search history.

(56) References Cited

U.S. PATENT DOCUMENTS

| | | | | |
|---|---|---|---|---|
| 9,556,910 | B2* | 1/2017 | Yamamoto | F16C 33/664 |
| 2011/0250976 | A1* | 10/2011 | Yamaguchi | B60T 17/02 |
| | | | | 464/182 |
| 2017/0343045 | A1* | 11/2017 | Asai | C10M 115/08 |
| 2018/0230396 | A1* | 8/2018 | Ito | C10M 141/10 |

* cited by examiner

*Primary Examiner* — Thomas R Hannon
(74) *Attorney, Agent, or Firm* — Muncy, Geissler, Olds & Lowe, P.C.

(57) ABSTRACT

A transmission shaft and peripheral structure comprises a first rotating shaft, a bearing, a first frame, a second rotating shaft, a second frame, a first gasket and a second gasket. The bearing is connected to the first rotating shaft. The first frame is connected to the bearing. The second rotating shaft is used for driving the first rotating shaft when the second rotating shaft rotates. The second frame is connected to the second rotating shaft. The first gasket is disposed under the bearing to cover the gap below the bearing. The second gasket is disposed above the bearing to cover the gap above the bearing. Silicone oil is filled between the first gasket and the bearing and between the second gasket and the bearing.

9 Claims, 3 Drawing Sheets

TRANSMISSION SHAFT AND PERIPHERAL STRUCTURE

RELATED APPLICATIONS

The present application claims the priority of Taiwan Application No. 107127587, filed on Aug. 8, 2018, the disclosure of which is hereby incorporated by reference herein in its entirety.

BACKGROUND OF THE INVENTION

1. Field of the Invention

The present disclosure generally relates to a transmission shaft and peripheral structure, and, more particularly, to a transmission shaft and peripheral structure applied to a handheld tool.

2. Description of the Related Art

In general, a handheld tool consist of a motor, a transmission, a tool part, and a housing. In the design of a transmission shaft and peripheral structure, the transmission shaft is generally connected to the inside of the bearing and the outside of the bearing is connected to the housing. Due to the gap of the connection portion between the housing and the upper and lower sides of the bearing, the peripheral structure of the transmission shaft and the transmission shaft will be the design focus when the handheld tool has waterproof requirements.

In the prior art, the waterproof design of the transmission shaft mainly consists of a washer or gasket made of silicone or plastic material to cover the gap between the transmission shaft and the peripheral structure. In order to achieve the waterproof effect, the washer or gasket must be tightly fitted to the transmission shaft. However, it will hinder the rotation of the transmission shaft. Moreover, the washer or gasket will be worn and the waterproof effect will be reduced after a period of time.

Therefore, how to provide a transmission shaft and peripheral structure that can avoid hindering the rotation of the transmission shaft and achieve waterproof effect has become an urgent problem to be solved by the industry.

SUMMARY OF THE INVENTION

In light of solving the foregoing problems of the prior art, one purpose of the present invention is to provide a transmission shaft and peripheral structure that can avoid hindering the rotation of the transmission shaft and achieve waterproof effect.

In order to achieve the above purposes, the transmission shaft and peripheral structure according to the present invention comprises a first rotating shaft, a bearing, a first frame, a second rotating shaft, a second frame, a first gasket and a second gasket.

The bearing is connected to the first rotating shaft. The first frame is connected to the bearing. The second rotating shaft is used for driving the first rotating shaft when the second rotating shaft rotates. The second frame is connected to the second rotating shaft. The first gasket is disposed under the bearing to cover the gap below the bearing. The second gasket is disposed above the bearing to cover the gap above the bearing. Silicone oil is filled between the first gasket and the bearing and between the second gasket and the bearing.

In an embodiment, silicone oil is filled between the first rotating shaft, the first frame, the second rotating shaft and the second frame.

In an embodiment, the first rotating shaft has a groove corresponding to the second gasket.

In an embodiment, the transmission shaft and peripheral structure according to the present invention further comprising a cover connected to the first frame and adjacent to the first gasket, and silicone oil is filled between the cover and the first gasket.

In an embodiment, the first frame has at least one groove corresponding to the cover.

In an embodiment, the first gasket or the second gasket is mainly composed of a silicone material.

In an embodiment, the transmission shaft and peripheral structure according to the present invention further comprising a first washer disposed between the upper side of the bearing and the first frame.

In an embodiment, the first washer is mainly composed of silicone material.

In an embodiment, the transmission shaft and peripheral structure according to the present invention further comprising a second washer disposed between the first frame and the second frame.

In an embodiment, the second washer is mainly composed of a silicone material.

In contrast with the prior art, the transmission shaft and peripheral structure according to the present invention uses the first gasket to cover the gap below the bearing and uses the second gasket to cover the gap above the bearing. Further, silicone oil is filled between the first gasket and the bearing and between the second gasket and the bearing. The silicone oil can bond the first gasket and the second gasket, and can fill the gap to prevent liquid from penetrating. With the help of the silicone oil, the first gasket and the second gasket do not need to be tightly fitted with the first rotating shaft and the second rotating shaft (as the transmission shaft) to achieve waterproof effect. Therefore, the rotation of the transmission shaft is not hindered and the waterproof function is not reduced due to wear. In this way, the problems in the prior art are sufficiently solved. In addition, silicone oil can be filled between the first rotating shaft, the first frame, the second rotating shaft and the second frame. By the lubrication of the silicone oil, it can reduce friction between the transmission shaft and other components when the transmission shaft rotates. The transmission shaft and peripheral structure according to the present invention can further comprise a first washer and a second washer to improve waterproof effect. If the first gasket, the second gasket, the first washer or the second washer is mainly composed of a silicone material, it is easier to bond with the silicone oil.

DETAILED DESCRIPTION

The present invention is described by the following specific embodiments. Those with ordinary skills in the arts can readily understand other advantages and functions of the present invention after reading the disclosure of this specification. Any changes or adjustments made to their relative relationships, without modifying the substantial technical contents, are also to be construed as within the range implementable by the present invention.

Figure 1:
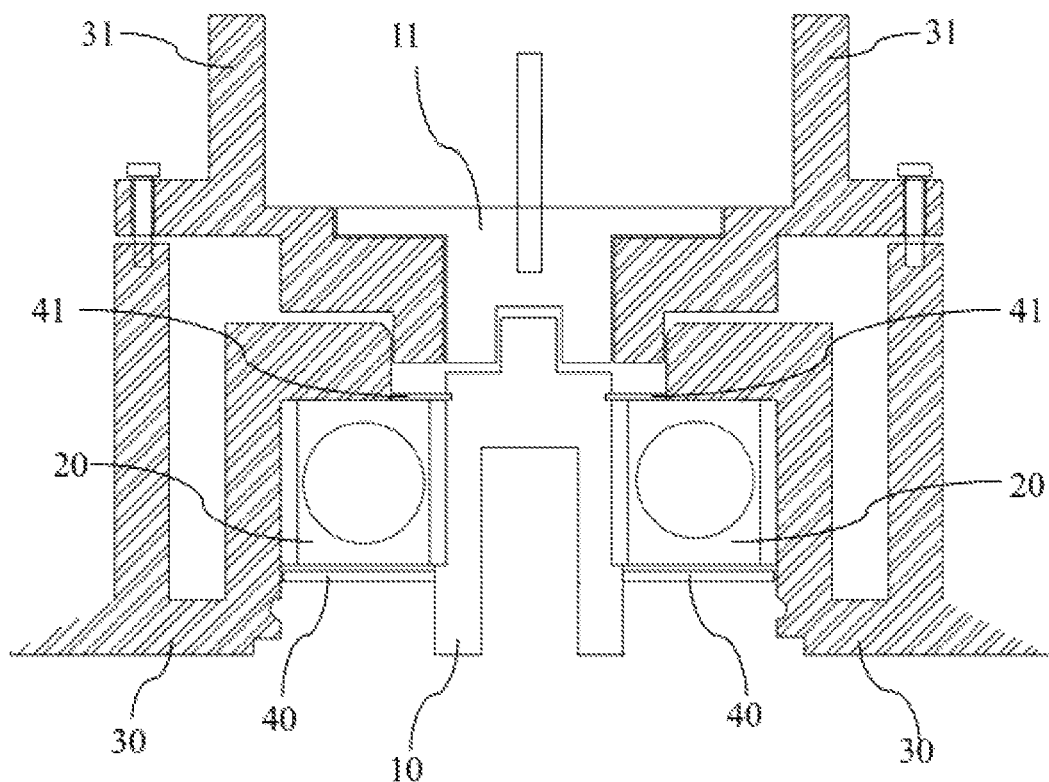
FIG. 1 illustrates a schematic diagram of a structure of a transmission shaft and peripheral structure according to a first embodiment of the present invention.

Please refer to FIG. 1. FIG. 1 illustrates a schematic diagram of a structure of a transmission shaft and peripheral structure according to a first embodiment of the present invention. As shown, the transmission shaft and peripheral structure according to the present invention comprises a first rotating shaft 10, a bearing 20, a first frame 30, a second rotating shaft 11, a second frame 31, a first gasket 40 and a second gasket 41. The transmission shaft and peripheral structure according to the present invention mainly applied to the field of handheld tools.

The bearing 20 is connected to the first rotating shaft 10. The bearing 20 is used for supporting the first rotating shaft 10 and maintaining the position when the first rotating shaft 10 rotates. In an embodiment, the inside of the bearing 20 is filled with silicone oil or lubricating oil. The first rotating shaft 10 can be directly or indirectly connected with a tool part (such as a grinding disc or a drill bit, etc.).

The second rotating shaft 11 is configured to drive the first rotating shaft 10 to rotate when the second rotating shaft 11 rotates. The second rotating shaft 11 can be indirectly connected to a power source (such as a motor) by other transmission components.

Figure 2:
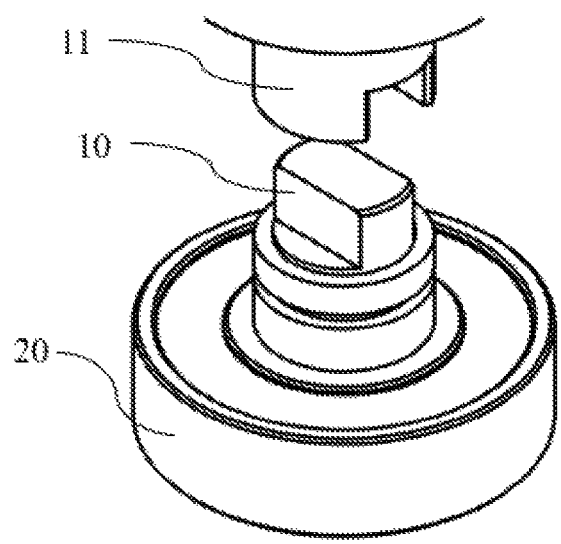
FIG. 2 illustrates a stereoscopic schematic diagram of a first rotating shaft and a second rotating shaft according to an embodiment of the present invention.

Please refer to FIG. 2. FIG. 2 illustrates a stereoscopic schematic diagram of a first rotating shaft and a second rotating shaft according to an embodiment of the present invention. As shown, the first rotating shaft 10 and the second rotating shaft 11 are used as a transmission shaft. The second rotating shaft 11 is configured to drive the first rotating shaft 10 to rotate when the second rotating shaft 11 rotates. Therefore, the shapes of the first rotating shaft 10 and the second rotating shaft 11 must correspond to each other. For example, The end of the first rotating shaft 10 may be a convex structure, and the ends of the second rotating shaft 11 may be concave bodies of opposite shapes. However, the first rotating shaft 10 and the second rotating shaft 11 do not need to be tightly fitted. A certain degree of gap may be left between the first rotating shaft 10 and the second rotating shaft 11. This design allows a larger error in assembly.

As shown in FIG. 1, the first frame 30 is connected to the bearing 20. The first frame 30 can be used to maintain the position of the bearing 20 and the first rotating shaft 10. The first frame 30 can partially cover the upper side of the bearing 20. The second frame 31 is connected to the second rotating shaft 11. The second frame 31 can be used to maintain the position of the second rotating shaft 11, but do not hinder the rotation of the second rotating shaft 11. In an embodiment, the first frame 30 and the second frame 31 may be integrally formed, or be connected to each other by other ways. For example, using bolts or other fasteners to connect.

The first gasket 40 is disposed under the bearing 20 to cover the gap below the bearing 20. The second gasket 41 is disposed above the bearing 20 to cover the gap above the bearing 20. A silicone oil is filled between the first gasket 40 and the bearing 20 and between the second gasket 41 and the bearing 20. Silicone oil has the characteristics of heat resistance, cold resistance, insulation, lubrication and hydrophobicity. Silicone oil can help the first gasket 40 and the second gasket 41 be bonded to the bearing 20, and can fill the gap between the first gasket 40, the second gasket 41 and other components. It will prevent liquid penetration and achieve good waterproof effect.

In an embodiment, the first gasket 40 and the second gasket 41 are substantially not in direct contact with the first rotating shaft 10 and the second rotating shaft 11 (as the transmission shaft). With the help of silicone oil, the first gasket 40 and the second gasket 41 do not need to be tightly fitted with the transmission shaft to achieve waterproof effect. Therefore, this configuration does not hinder the rotation of the transmission shaft and does not reduce the waterproof function due to wear.

In an embodiment, silicone oil is filled between the first rotating shaft 10, the first frame 30, the second rotating shaft 11 and the second frame 31. Filling the gap between the components with silicone oil is able to further enhance the waterproof function. Furthermore, the lubricity of silicone oil also helps to reduce friction between the transmission shaft (the first rotating shaft 10 and the second rotating shaft 11) and other components when the transmission shaft rotates.

Figure 3:
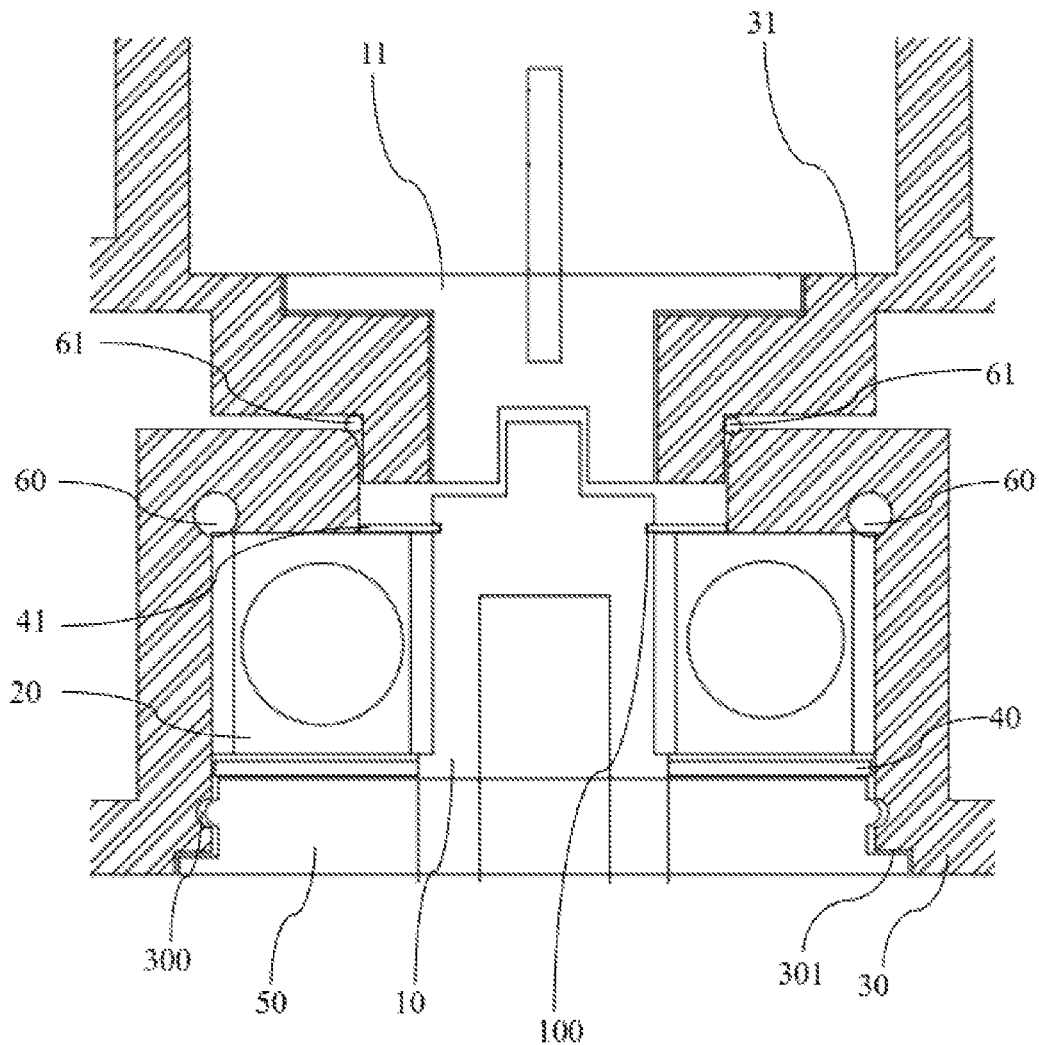
FIG. 3 illustrates a schematic diagram of a structure of a transmission shaft and peripheral structure according to a second embodiment of the present invention.

Please refer to FIG. 3. FIG. 3 illustrates a schematic diagram of a structure of a transmission shaft and peripheral structure according to a second embodiment of the present invention. In an embodiment, the first rotating shaft 10 has a groove 100 corresponding to the second gasket 41. The groove 100 helps to further improve the waterproof function, and silicone oil can also be filled in the groove 100.

In an embodiment, the transmission shaft and peripheral structure according to the present invention further comprising a cover 50 connected to the first frame 30 and adjacent to the first gasket 40, and silicone oil being filled between the cover 50 and the first gasket 40. The cover 50 can further improve the waterproof function and protect the internal components. The cover 50 can also support and maintain the position of the bearing 20 and the first gasket 40.

In an embodiment, the first frame 30 has at least one groove 300, 301 corresponding to the cover 50. The grooves 300, 301 can improve the waterproof function and the bonding strength of the first frame 30 and the cover 50. Silicone oil can also be filled in the grooves 300, 301.

In an embodiment, the first gasket 40 or the second gasket 41 is mainly composed of a silicone material, but not limited thereto. Using the silicone material is easier to bond with the silicone oil.

In an embodiment, the transmission shaft and peripheral structure according to the present invention further comprising a first washer 60 disposed between the upper side of the bearing 20 and the first frame 30. There may be a gap between the bearing 20 and the first frame 30. Therefore, attaching the first washer 60 can cover the gap or prevent the silicone oil from flowing out, in order to further improve the waterproof function.

In an embodiment, the first washer 60 is mainly composed of a silicone material, but not limited thereto. Using the silicone material is easier to bond with the silicone oil.

In an embodiment, the transmission shaft and peripheral structure according to the present invention further comprising a second washer 61 disposed between the first frame 30 and the second frame 31. There may be a gap between the first frame 30 and the second frame 31. Therefore, attaching the second washer 61 can cover the gap or prevent the silicone oil from flowing out, in order to further improve the waterproof function.

In an embodiment, the second washer 61 is mainly composed of silicone material, but not limited thereto. Using the silicone material is easier to bond with the silicone oil.

In summary, the transmission shaft and peripheral structure according to the present invention uses the first gasket to cover the gap below the bearing and uses the second gasket to cover the gap above the bearing. Further, silicone oil is filled between the first gasket and the bearing and between the second gasket and the bearing. The silicone oil can bond the first gasket and the second gasket, and can fill the gap to prevent liquid from penetrating. With the help of the silicone oil, the first gasket and the second gasket do not need to be tightly fitted with the first rotating shaft and the second rotating shaft (as the transmission shaft) to achieve waterproof effect. Therefore, the rotation of the transmission shaft is not hindered and the waterproof function is not reduced due to wear. In this way, the problems in the prior art are sufficiently solved. In addition, silicone oil can be filled between the first rotating shaft, the first frame, the second rotating shaft and the second frame. By the lubrication of the silicone oil, it can reduce friction between the transmission shaft and other components during the transmission shaft rotating. The transmission shaft and peripheral structure according to the present invention can further comprise a first washer and a second washer to improve waterproof effect. If the first gasket, the second gasket, the first washer or the second washer is mainly composed of a silicone material, it is easier to bond with the silicone oil.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A transmission shaft and peripheral structure, comprising:
    a first rotating shaft;
    a bearing connected to the first rotating shaft;
    a first frame connected to the bearing;
    a second rotating shaft used for driving the first rotating shaft when the second rotating shaft rotates;
    a second frame connected to the second rotating shaft;
    a first gasket disposed under the bearing to cover the gap below the bearing;
    a second gasket disposed above the bearing to cover the gap above the bearing,
    wherein silicone oil is filled between the first gasket and the bearing and between the second gasket and the bearing, and
    wherein the first rotating shaft has a groove corresponding to the second gasket.

2. The transmission shaft and peripheral structure of claim 1, wherein silicone oil is filled between the first rotating shaft, the first frame, the second rotating shaft and the second frame.

3. The transmission shaft and peripheral structure of claim 1, further comprising a cover connected to the first frame and adjacent to the first gasket, and silicone oil is filled between the cover and the first gasket.

4. The transmission shaft and peripheral structure of claim 3, wherein the first frame has at least one groove corresponding to the cover.

5. The transmission shaft and peripheral structure of claim 1, wherein the first gasket or the second gasket is mainly composed of silicone material.

6. The transmission shaft and peripheral structure of claim 1, further comprising a first washer disposed between the upper side of the bearing and the first frame.

7. The transmission shaft and peripheral structure of claim 6, wherein the first washer is mainly composed of silicone material.

8. The transmission shaft and peripheral structure of claim 1, further comprising a second washer disposed between the first frame and the second frame.

9. The transmission shaft and peripheral structure of claim 8, wherein the second washer is mainly composed of silicone material.

* * * * *